(12) United States Patent
Takenaga et al.

(10) Patent No.: US 6,191,704 B1
(45) Date of Patent: Feb. 20, 2001

(54) RUN ENVIRONMENT RECOGNIZING APPARATUS

(75) Inventors: Hiroshi Takenaga, Tokai-mura; Hiroshi Kuroda, Hitachi; Satoru Kuragaki, Hitachi; Mitsuo Kayano, Hitachi; Tokuji Yoshikawa, Hitachi; Hiroto Morizane, Hitachi; Kazuaki Takano, Mito, all of (JP)

(73) Assignee: Hitachi, Ltd,, Tokyo (JP)

( * ) Notice: Under 35 U.S.C. 154(b), the term of this patent shall be extended for 0 days.

(21) Appl. No.: 08/994,750

(22) Filed: Dec. 19, 1997

(30) Foreign Application Priority Data

Dec. 19, 1996 (JP) .................................................. 8-339724

(51) Int. Cl.$^7$ ....................................................... G08G 1/16
(52) U.S. Cl. ......................... 340/903; 180/169; 340/435; 348/148; 348/170
(58) Field of Search .................................... 340/903, 901, 340/904, 435; 348/148, 149, 170, 169; 180/169; 701/117; 356/4.01, 4.03

(56) References Cited

U.S. PATENT DOCUMENTS

| | | | | |
|---|---|---|---|---|
| 5,386,285 | * | 1/1995 | Asayama ............................... | 340/435 |
| 5,475,494 | * | 12/1995 | Nishida et al. ........................ | 340/435 |
| 5,612,686 | * | 3/1997 | Takano et al. ........................ | 340/435 |
| 5,617,085 | * | 4/1997 | Tsutsumi et al. ..................... | 340/435 |
| 5,621,645 | * | 4/1997 | Brady .................................... | 340/903 |

OTHER PUBLICATIONS

Driving Environment Recognition System on Highway, H. Yasugi et al., pp. 1116–1121.

* cited by examiner

Primary Examiner—Brent A. Swarthout
(74) Attorney, Agent, or Firm—Evenson, McKeown, Edwards & Lenahan, P.L.L.C.

(57) ABSTRACT

Described herein is a run environment recognizing apparatus. The run environment recognizing apparatus comprises an imaging device for sensing the direction of traveling of a host vehicle as imaging vision, a radar for detecting the direction of traveling of the host vehicle as a detection range, an image processing device for recognizing traveling lanes, leading vehicles and stationary objects located ahead of the host vehicle, based on the image information sensed by the imaging device and the result of detection by the radar, and a display for displaying the results of recognition by the image processing device. The image processing device includes means for setting vehicle regions indicative of the leading vehicles within the image information, based on the result of detection by the radar. Thus, the influence of the leading vehicles in the process for recognizing the traveling lanes within the image information is eliminated by the vehicle regions.

16 Claims, 12 Drawing Sheets

FIG. 11

NODE TABLE

| NODE NUMBER | |
|---|---|
| 15 | NODE X' COORDINATE : 100<br>NODE Y' COORDINATE : 120<br>NUMBER OF LINKS : 4<br>LINK NUMBERS : 20, 21, 19, 30 |
| 34 | NODE X' COORDINATE : 180<br>NODE Y' COORDINATE : 140<br>NUMBER OF LINKS : 4<br>LINK NUMBERS : 40, 41, 55, 60 |

LINK TABLE

| LINK NUMBER | |
|---|---|
| 21 | START NODE NUMBER : 15<br>END MODE NUMBER : 34<br>LINK LENGTH : 500 |
| 55 | START NODE NUMBER : 34<br>END MODE NUMBER : 15<br>LINK LENGTH : 650 |

RUN ENVIRONMENT RECOGNIZING APPARATUS

BACKGROUND OF THE INVENTION

The present invention relates to an apparatus mounted on a vehicle (hereinafter called "host vehicle") such as an automobile or the like, for recognizing environments of a road along which the vehicle runs, and particularly to an apparatus for recognizing a run environment by image processing.

With an increase in vehicle performance, the provision of a preventive safety function for recognizing ambient environments such as traveling lanes, other vehicles, etc. under which a host vehicle runs, detecting conditions that an accident is likely to occur, and giving a warning to a driver to encourage a danger avoidance operation or positively automatically-controlling the vehicle, thereby preventing the accident beforehand has been of importance.

Further, there has been a growing great interest in a system such as autocruising for positively controlling the vehicle, e.g., controlling the distance between vehicles constant to thereby drive the vehicle as well as the issuance of the warning to the driver at this time, automatic operation or the like. However, the achievement of such preventive safety, autocruising driving and automatic operation needs to recognize the run environment of the host vehicle at high speed.

Therefore, a technique has heretofore been used which electrically processes image information with the front of a vehicle as the center by using an imager or imaging device such as a TV camera or the like so as to extract traveling lanes and other vehicles or the like, thereby recognizing the run environment of the vehicle.

The prior art has a problem in that no consideration is given to a point of view that image signal processing required to extract the traveling lanes and other vehicles or the like from the image information becomes massive and a great buildup in signal processing capability with respect to the required response is required.

Namely, it is necessary to search and quarry out an object to be recognized from the image information upon recognizing the vehicle run environment based on the image information. However, since the process for quarrying out the object to be recognized from the complex image information obtained from the imaging device is executed as it is in the prior art, massive amounts of calculations are necessary for its signal processing. As a result, the maintenance of a required response involves a great buildup in signal processing capability.

A demand for the recognition intended even for a general road as well as for a motor road (express highway) in which run environments do not change so much, has been increased recently in particular. However, the fulfillment of this demand needs to recognize even a traffic signal, and right- and left-turned vehicles and pedestrians or the like placed in an intersection. A further complex image is intended for its recognition.

In doing so, the prior art needs more massive amounts of calculations to quarry out the objects such as the traffic signal or the like as well as the traveling lanes, the leading vehicles from such more complex image. Thus, the above problem will result in more intensification.

SUMMARY OF THE INVENTION

With the foregoing in view, it is therefore an object of the present invention to provide a run environment recognizing apparatus capable of maintaining a sufficient response while controlling an increase in the amount of calculation.

According to one aspect of the invention, for achieving the above object, there is provided a run environment recognizing apparatus comprising:

an imaging device for sensing the direction of traveling of a host vehicle as imaging vision;

a radar for detecting the direction of traveling of the host vehicle as a detection range;

an image processing device for recognizing traveling lanes, leading vehicles and stationary objects located ahead of the host vehicle, based on the image information sensed by the imaging device and the result of detection by the radar; and a display for displaying the results of recognition by the image processing device;

the image processing device including means for setting vehicle regions indicative of the presence of the leading vehicles within the image information, based on the result of detection by the radar;

whereby the influence of the leading vehicles in the process for recognizing the traveling lanes within the image information is eliminated by the vehicle regions.

According to the above invention, the imaging device senses or records an image about the traveling direction of the vehicle by photography.

The image processing device estimates the positions of traveling lanes, leading vehicles, stationary objects, a traffic signal, a pedestrian crossing, etc. within the image obtained from the imaging device and thereby recognizes a run environment around the vehicle.

The radar emits radio waves or a laser beam therefrom and electrically processes a reflected signal to thereby measure distances and bearings to the leading vehicles or stationary objects ahead of the vehicle.

There is provided a run environment recognizing apparatus further including a road map device for associating a vehicle position obtained from a GPS (Global Positioning System) with a road map and outputting information about the presence or absence of an intersection ahead of the vehicle and the distance to the intersection to the image processing device.

BRIEF DESCRIPTION OF THE DRAWINGS

Other objects and advantages of the present invention will be more completely understood from the following detailed description, taken in conjunction with the accompanying drawings wherein:

FIG. 11 is a diagram for describing a road map database employed in the embodiment shown in FIG. 1.

DETAILED DESCRIPTION OF THE PREFERRED EMBODIMENTS

A run environment recognizing apparatus according to the present invention will hereinafter be described in more details by one embodiment illustrated in the accompanying drawings.

Figure 1:
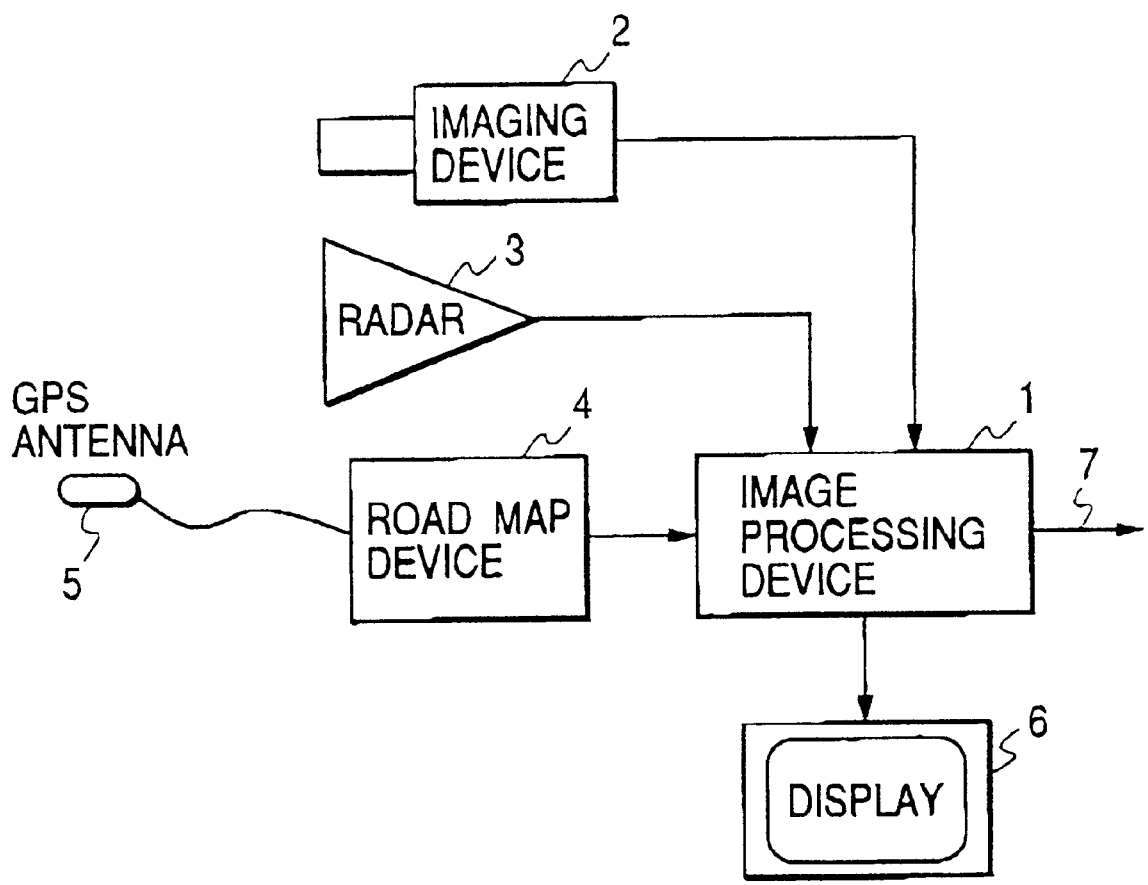
FIG. 1 is a block diagram showing one embodiment of a run environment recognizing apparatus according to the present invention.

FIG. 1 shows one embodiment of the present invention. Reference numerals 1, 2, 3, 4, 5 and 6 indicate an image processing device, an imager or imaging device, a radar, a road map device, a GPS antenna and a display respectively.

Further, they are installed on a vehicle 100 and used as shown in FIG. 2, for example. Thus, the present vehicle 100 is hereinafter referred to as "host vehicle 100".

Figure 2A:
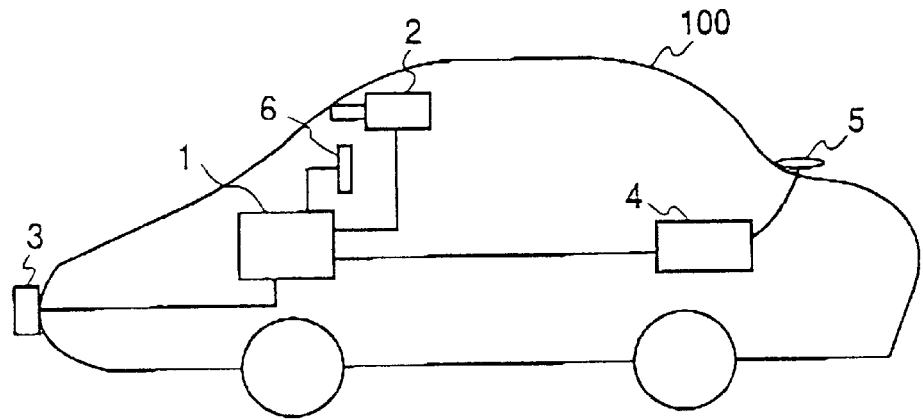
FIG. 2 is a diagram illustrating the placement of respective devices employed in the embodiment of the run environment recognizing apparatus shown in FIG. 1.
Figure 2B:
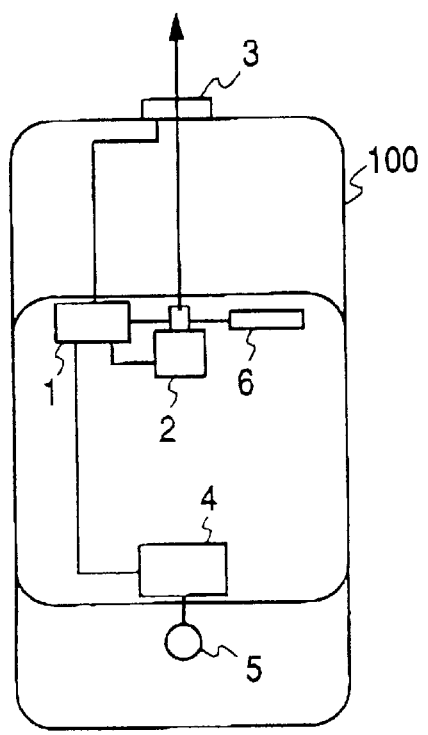

In FIG. 2, the host vehicle 100 is an automobile, for example. FIG. 2(a) shows the state of the host vehicle 100 as seen from the side thereof and FIG. 2(b) shows the state of the host vehicle 100 as seen from the top surface thereof.

The image processing device 1 is provided with a microcomputer and has predetermined programs installed therein. Further, the image processing device 1 is supplied with predetermined various kinds of signals from the imaging device 2, the radar 3 and the road map device 4 or the like to thereby execute various image signal processes to be described later.

The imaging device 2 is made up of a television camera or the like with a predetermined range ahead of the host vehicle 100 defined as imaging vision and serves so as to supply an image signal indicative of the host vehicle 100 being driven to the image processing device 1.

The radar 3 serves so as to measure a distance and an orientation or bearing to an object located ahead of the host vehicle 100 by using radio waves or a laser beam (hereinafter called "radio waves or the like") and supply the results of measurement to the image processing device 1. At this time, however, a radiation axis, i.e., a detection axis of the radio waves or the like emitted from the radar 3 when the bearing is 0, is placed so as to match with the same axis Z as an imaging optical axis of the imaging device 2 as is apparent from FIG. 2(b) to simplify coordinate transformation to be described later.

Incidentally, the imaging device 2 and the radar 3 do not necessarily require this placement. When an image as seen from a driver's point of view is required, the imaging device may be placed on the driver's seat side.

If the imaging device is placed on the side opposite to the driver's seat, images including portions out of sight from the driver can be obtained.

The road map device 4 constitutes a vehicle position detecting device using satellite radio waves, which is already known as a car navigation system together with the GPS antenna 5. The road map device 4 serves so as to sequentially detect the position of the host vehicle 100, select image information about a road map corresponding to the detected position from a memory device and supply the result of detection of its position and an image signal necessary for the display of the road map to the image processing device 1.

The display 6 comprises an image monitor such as a color liquid crystal display device or the like and serves so as to display image information supplied from the image processing device 1 as a color image and thereby allow the driver to recognize it.

A method of recognizing an environment around a driven vehicle by means of the run environment recognizing apparatus shown in FIGS. 1 and 2 will next be described below.

Figure 3:
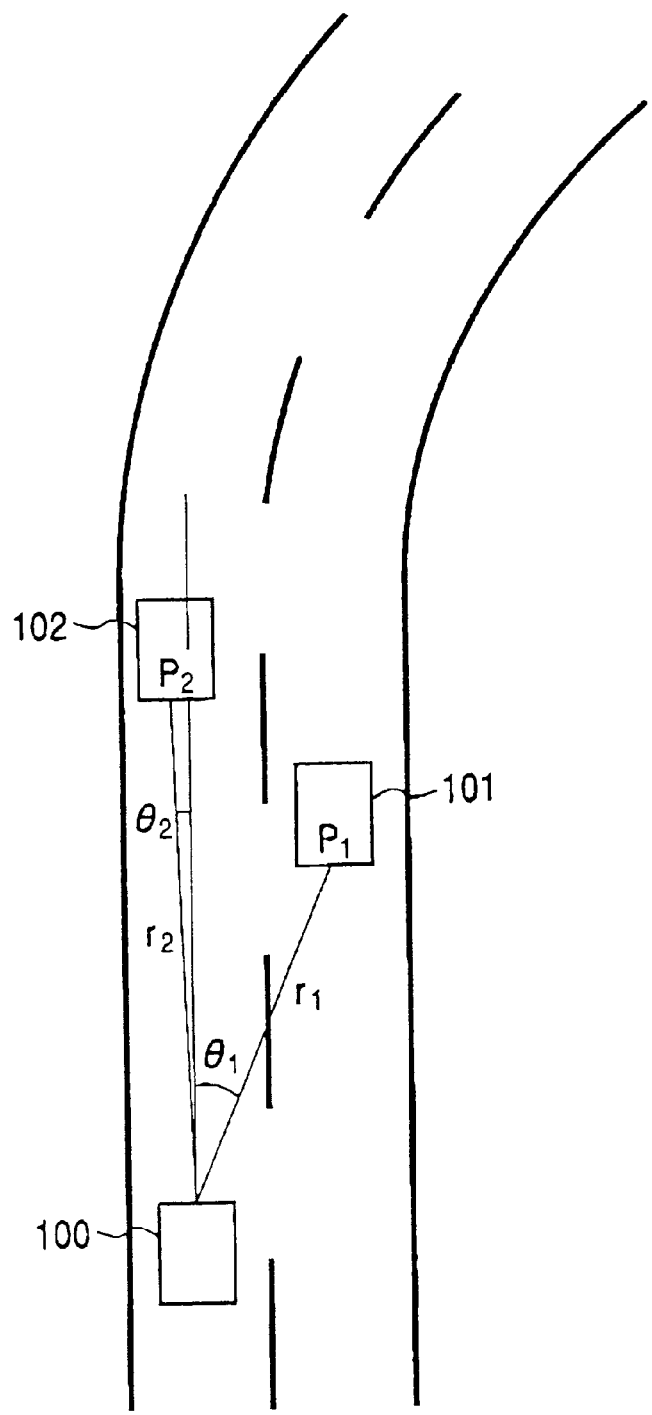
FIG. 3 is an explanatory diagram depicting one example of vehicle positions on an express highway track intended by the present invention.

Now consider, in the embodiment of the present invention, where as shown in FIG. 3 by way of example, advanced or leading (forward) vehicles 101 and 102 exist ahead of the host vehicle 100 on an express highway having a right curve toward the front and they are both running. Here, traveling lanes will be defined by white lines drawn on a road surface.

In FIG. 3, symbols r1 and r2 respectively indicate distances to points P1 and P2 of the leading vehicles 101 and 102, which have been measured by the radar 3 mounted on the host vehicle 100. Symbols θ1 and θ2 respectively indicate angles, i.e., bearings formed between the Z axis and the points P1 and P2 with the Z axis as the reference.

Figure 4:
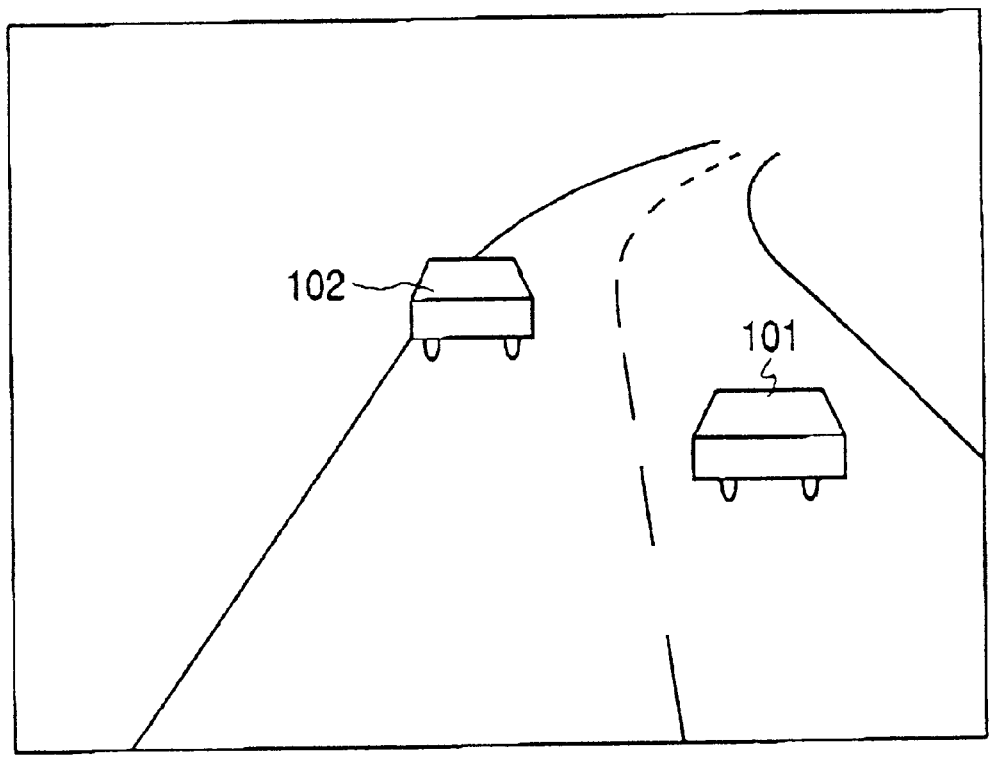
FIG. 4 is an explanatory diagram showing an example of image-sensed pictures obtained by the embodiment shown in FIG. 1.

When the conditions shown in FIG. 3 are photographed or shot by the imaging device 2 mounted on the host vehicle 100, an image shown in FIG. 4 can be obtained.

Since a part of the white line defining one traveling lane is hidden by the leading vehicle 102 in the image shown in FIG. 4, the hidden part needs not to be subjected to a white line recognizing process. It is necessary to first extract the leading vehicle 102 for that purpose.

Since, however, the surroundings of a road are generally represented as complex background images and vehicle shadows also exist although not shown in FIG. 4, the intended vehicle must be extracted from the image while excluding these.

Thus, this is why much processing time has been required in the prior art.

According to the present embodiment, however, this inconvenience can be easily solved by using the signal transmitted from the radar 3. Namely, the radar 3 can measure the distance to each of the leading vehicles and their bearings as described above and hence the above problem can be solved by using these distances and bearings.

If the distances and bearings of the leading vehicles are found in this way, then the correspondence of the distances and bearings thereof and the image photographed by the imaging device 2 can be easily obtained by the coordinate transformation made by the image processing device 1.

At this time, however, the radar 3 will detect all the objects from which the radio waves or the like are reflected, as well as each leading vehicle.

Thus, the image processing device 1 calculates a change in the distance detected by the radar 3 and measures the relative velocity between each detected object and the host vehicle. It can be thus judged that, for example, an object that will approach the host vehicle at the same speed as that for the host vehicle, is a stationary object and an object that will approach the host vehicle at a speed faster than that for the host vehicle, is a vehicle opposed to the host vehicle. As a result, information about the leading vehicles alone is extracted by selecting only ones whose relative velocities are less than or equal to a predetermined value.

The coordinate transformation to be executed by the image processing device 1 will next be explained.

In the present embodiment, the following two-stage steps are first used to make correspondences between the images of the leading vehicles, which have been sensed by the imaging device 2 and the distances and bearings measured by the radar 3.

(1) Step for mapping the leading vehicles 101 and 102 on an image surface in consideration of an elevation angle and a focal length of the imaging device 2.

(2) Step for converting or transforming the distances to the leading vehicles 101 and 102 and their bearings both measured by the radar 3 into the distances and bearings as seen from a lens of the imaging device 2 and displaying them.

In the present embodiment, coordinate transformation between a coordinate system (called "radar coordinate system") with the radar 3 as the point of origin and a coordinate system (called "world coordinate system") with the lens of the imaging device 2 as the point of origin, and coordinate transformation between the world coordinate system and a coordinate system (called "image coordinate system") set on the image surface are used to display the leading vehicles 101 and 102 on the image surface.

Further, the coordinates of the leading vehicles in the world coordinate system are utilized for the transformation of the distances and bearings.

These will hereinafter be described in the following order:

A. Definition of the world coordinate system, image coordinate system and radar coordinate system B. Method of transforming the leading vehicles represented by the radar coordinate system into those represented by the image coordinate system A. About the definition of the world coordinate system, image coordinate system and radar coordinate system:

<World Coordinate System>

The world coordinate system (X, Y and Z) corresponds to a coordinate system fixed to a vehicle, i.e., a right-hand coordinate system in which the traveling direction of the vehicle as seen from the center of the lens is defined as a Z axis. Thus, the point of origin O (0, 0 and 0) is represented as the central point of the lens.

<Image Coordinate System>

Figure 5:
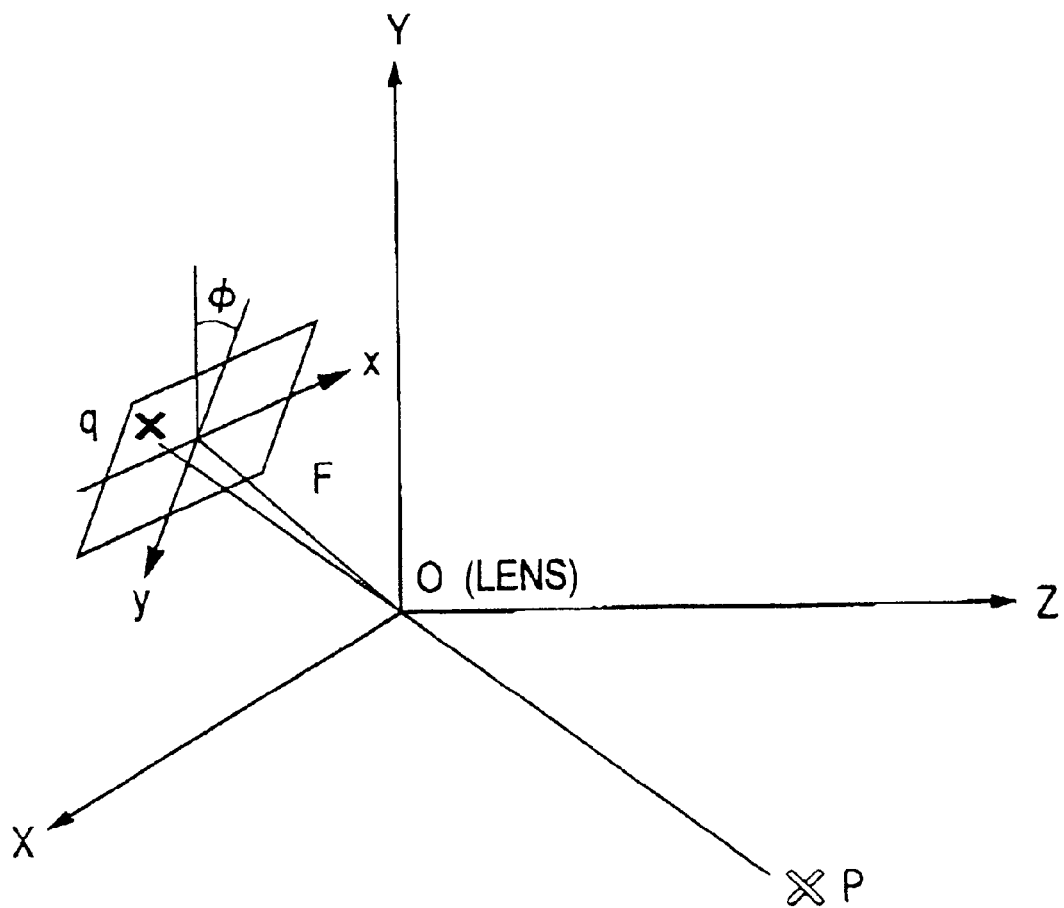
FIG. 5 is a diagram for describing a world coordinate system and an image coordinate system employed in the embodiment shown in FIG. 1.

As shown in FIG. 5, an x axis of the image coordinate system (x, y) is parallel to the X axis of the world coordinate system and extends in the direction opposite to the X axis thereof and a y axis thereof extends in the direction opposite to the Y axis thereof. Further, they are respectively inclined an angle $\phi$ toward the upward and downward directions of the optical axis of the lens of the imaging device 2.

Thus, if the focal length of the lens of the imaging device 2 is defined as F, the point of origin of the image coordinate system results in (0, Fsin$\phi$, −Fcos$\phi$) in the world coordinate system.

Further, the relationship between a point P (X, Y, Z) in the world coordinate system and a point q (x, y) in the image coordinate system at the time that the point P is seen therethrough on an image, is given by the following equation (1):

$$x = -FX/(Z\cos\phi - Y\sin\phi) \quad y = -F(Y\cos\phi - Z\sin\phi)/(Z\cos\phi - Y\sin\phi) \quad (1)$$

<Radar Coordinate System>

Figure 6:
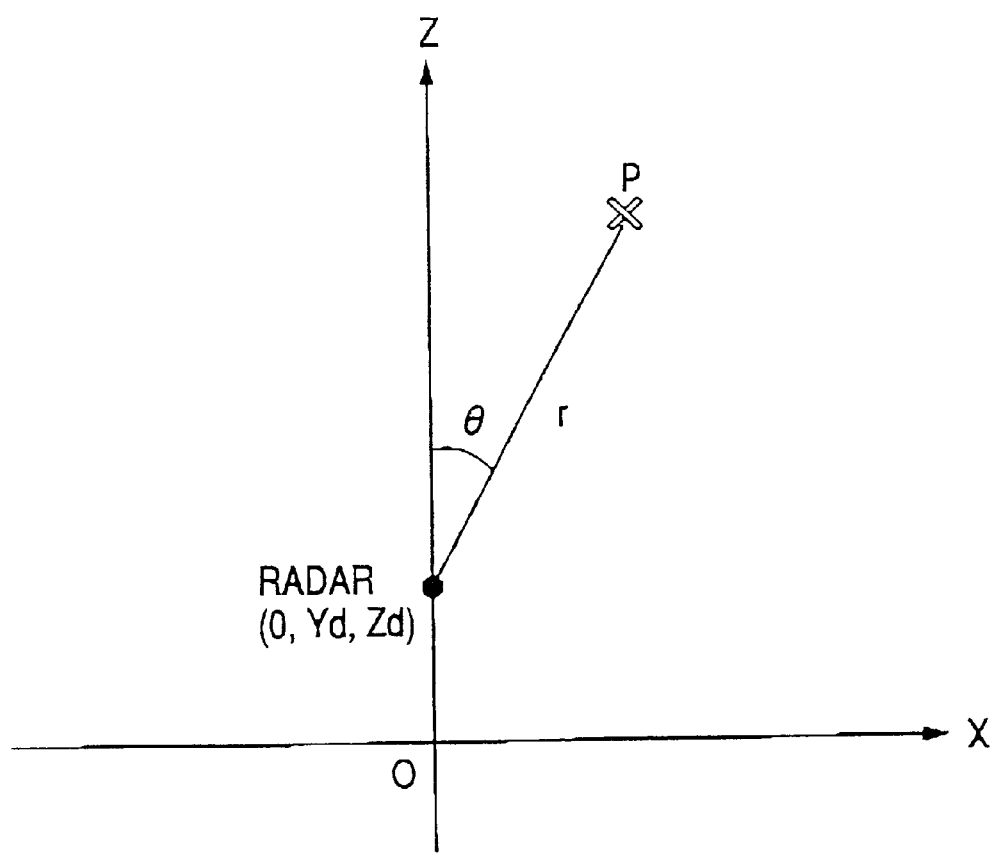
FIG. 6 is a diagram for describing a world coordinate system and a radar coordinate system employed in the embodiment shown in FIG. 1.

The radar coordinate system (r, $\theta$) indicates a polar coordinate system with the radar 3 as the point of origin as shown in FIG. 6. Symbol $\theta$ is rotated counterclockwise from the Z axis of the world coordinate system.

Assuming now that the coordinates of the point of origin in the radar coordinate system with respect to the world coordinate system are defined as (0, $Y_d$, $Z_d$), the relationship between a point P (r, $\theta$) in the radar coordinate system and a point P (X, Y, Z) obtained by viewing this point from the world coordinate system is given by the following equation (2):

$$X = -r\sin\theta \quad Y = Y_d \quad Z = Z_d + r\cos\theta \quad (2)$$

B. About the method of transforming the leading vehicles represented by the radar coordinate system into those represented by the image coordinate system A description will be made of coordinates in the image coordinate system, of the leading vehicle P whose distance r and bearing $\theta$ are measured by the radar 3 as shown in FIG. 6.

First of all, the coordinates of the radar 3 in the world coordinate system will be defined as (0, $Y_d$, $Z_d$).

Since, on the other hand, the coordinates (X, Y, Z) of the leading vehicle P in the world coordinate system are given by the above-described equation (2), the coordinates of the coordinates (X, Y, Z) on the image coordinate system are given by the following equation (3) using the above-described equation (1):

$$x = -Fr\sin\theta/[(Z_d + r\cos\theta)\cos\phi - Y_d\sin\phi] \quad y = -F[Y_d\cos\phi - (Z_d + r\cos\theta)\sin\phi]/[(Z_d + r\cos\theta)\cos\phi - Y_d\sin\phi] \quad (3)$$

Figure 7:
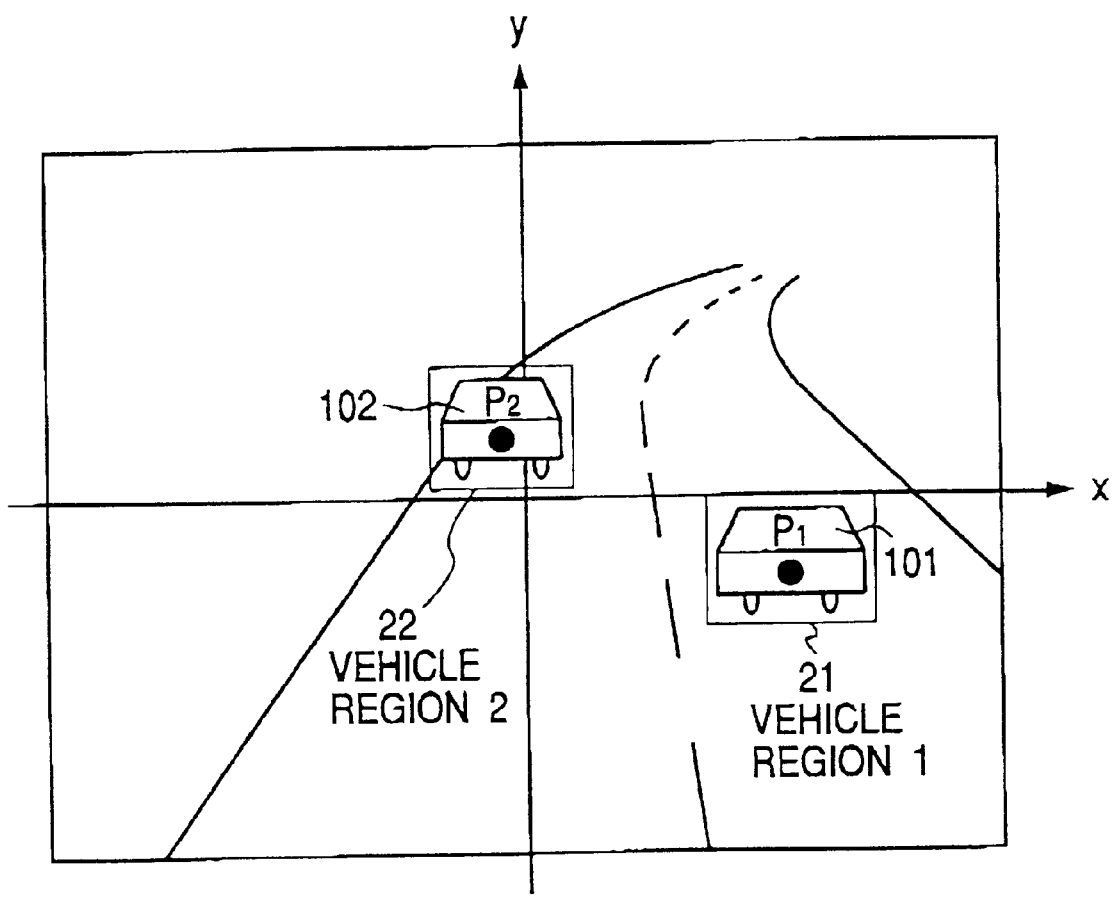
FIG. 7 is a diagram for describing a leading-vehicle region estimating process employed in the embodiment shown in FIG. 1.

By using the equation (3), the positions of the leading vehicles 101 and 102, which have been measured by the radar 3, can be associated with images displayed on the display 6 as shown in FIG. 7, respectively.

After the positions P1 and P2 of the leading vehicles 101 and 102 have been determined as shown in FIG. 7, vehicle-existing regions are next estimated by the image processing device 1 in the following manner.

The knowledge that a large number of similar pixel components are contained in the vehicle images in the horizontal direction, is first used. For example, the brightness or color of each image is examined along the x axis from the point P1 and pixels close to the brightness or color of the point PI are compiled, whereby a horizontal width of the vehicle-existing region 21 can be measured.

The type (large, middle or small size) of vehicle can be determined from the horizontal width and distance. Further, the height of the vehicle, i.e., a vertical width of the vehicle-existing region 21 can be estimated from the type of vehicle. Eventually, the vehicle region 21 in which the leading vehicle 101 exists, can be estimated over its entirety as shown in FIG. 7.

If a process similar to the above is effected on the point P2, then a vehicle region 22 in which the leading vehicle 102 exists, can be estimated as shown in FIG. 7 in the same manner as described above.

When the vehicle regions are estimated in this way, the traveling lanes may be recognized so as to avoid the vehicle regions.

In the present embodiment, the white lines drawn on the road surface are utilized to recognize the traveling lanes. The image processing device 1 is constructed so as to recognize the white lines in the following manner.

Figure 8:
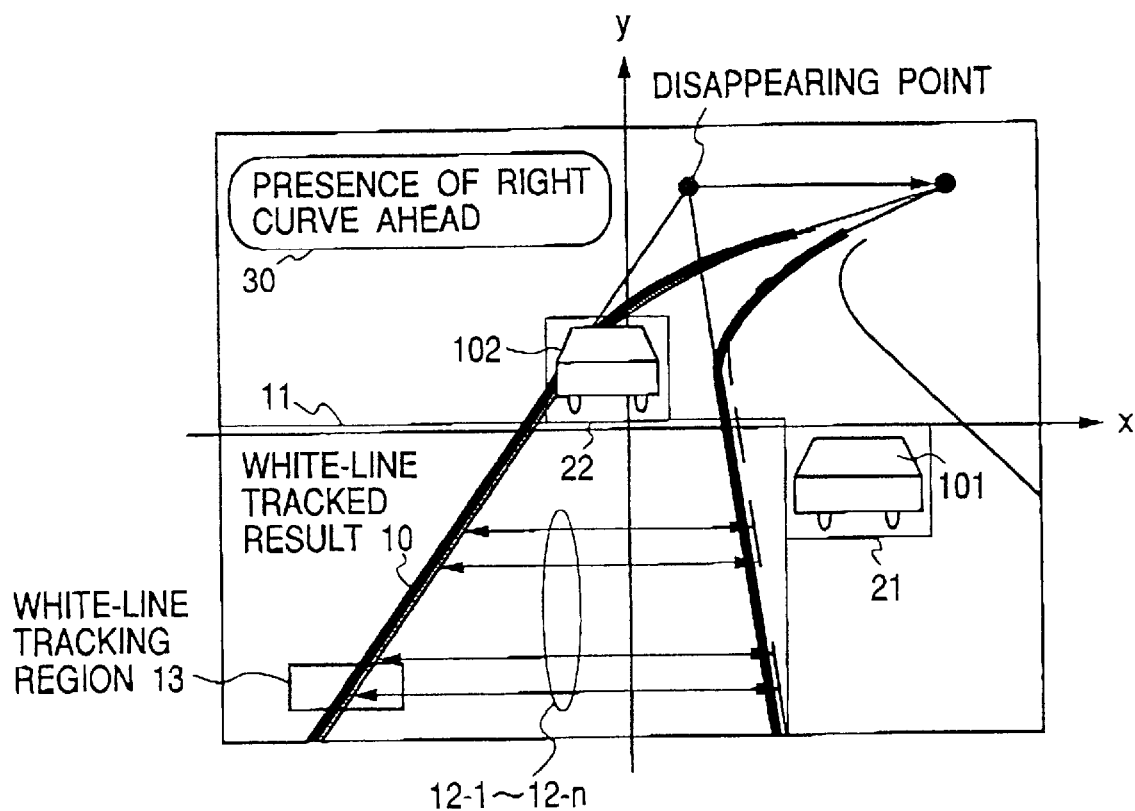
FIG. 8 is a diagram for describing a white-line recognition estimating process and a white-line tracking process employed in the embodiment shown in FIG. 1.

Namely, as shown in FIG. 8, an inverter 11 for creating an initial model of a white line is determined and the initial model of the white line is created within the region 11. Next, the initial model is deformed so as to fit on an image of the actual white line.

The region 11 is first determined as follows:

The length in the y-axis direction of the region 11 extends from below the screen to the lower end of the vehicle region 22. The length in the x-axis direction of the region 11 extends from the left end of the screen to the left end of the vehicle region 21.

If done in this way, then the initial model of each white line can be created without being subjected to interference from a vehicle running in the forward direction.

Next, the initial model of each white line is created.

A horizontal differentiating process for emphasizing a change in horizontal brightness of each image with respect to the entire image shown in FIG. 8 is first executed.

Next, a plurality of line segments 12-1 through 12-n extending in parallel to the x axis are set to the region 11. Thereafter, luminance levels of pixels are successively examined along these line segments. Further, the position of a pixel having a luminance greater than or equal to a predetermined luminance change level achieved in the first place is defined as an edge of a first white line and the position of a pixel having a luminance greater than or equal to a predetermined luminance change level achieved in the second place is defined as an edge of a second white line.

Next, two white line models are created by linear approximation, based on the positions of the edges of the first and second white lines. A point where extensions of these two straight lines intersect, will be defined as a disappearing point of a road.

Since, however, the initial models of the white lines, which have been created in this way, are limited within the region 11 and simply make use of the white line edges detected with typical lines as in the line segments 12-1 through 12-n, the white lines located within the region 11 are not accurately obtained and it is not possible to determine how the white lines change outside the region 11.

Therefore, a white line fitting process for deforming the initial models so as to match with the actual white lines represented as images is finally executed.

Thus, a white line tracking region 13 of a predetermined size is first set as shown in FIG. 8 with the position of the edge of the white line detected by the line segment 12-1 as the center.

Next, the white line tracking region 13 is moved along its corresponding white line model so that the white line model is changed so as to fit to the inclination of the edge of the white line located within the white line tracking region 13.

A method of fitting the inclination at this time thereto is as follows: For example, a plurality of line segments similar to those used when the initial model of the white line is created within the white line tracking region 13, are set and the position of the edge of the white line is determined along these line segments. Thereafter, the inclination may be determined from the edge position.

Next, an initial model for the white line is created again by using the inclination determined within the white line tracking region 13.

Further, the white line tracking region 13 is moved along the re-created model in the direction of the disappearing point, where the inclination of the white line in the white line tracking region 13 is determined to thereby change the model.

This operation is hereinafter repeated until the disappearing point is included in the white line tracking region 13.

There is a possibility that the white line will be hidden by the vehicle where the white line tracking region 13 collides with the vehicle region (corresponding to the vehicle region 22 in FIG. 8) when the white line tracking region 13 is allowed to move.

Therefore, the white line tracking region 13, which has been moved by paying attention to the first white line edge up to now, is displaced along a white line that has taken note of a white line model on the right side. A white line model fitting process is continued in this way.

Meanwhile, the disappearing point is not displaced when the road is linear, whereas when the road is curved as shown in FIG. 8, the disappearing point is shifted by the white line fitting process.

Therefore, the position of the present disappearing point is compared with the previous position thereof each time the disappearing point is detected, to thereby determine the quantity of its movement. When the quantity of its movement exceeds a predetermined value, the curve is judged to exist ahead. Further, when the direction of movement of the disappearing point takes an x-axis direction as shown in FIG. 8, the right curve is judged to exist ahead. When, on the other hand, the direction thereof assumes a−x-axis direction, the left curve is judged to exist ahead.

If the curve is judged or determined to exist in this way, then the image processing device 1 supplies a predetermined signal to the display 6 where the result of determination is displayed on a message region 30 of a display screen thereof as a composition as shown in FIG. 8 to thereby call attention to a driver and obtain observance of a safety speed and unerring steering.

At this time, the image processing device 1 outputs the predetermined signal even to a signal line 7 so as to be used for control of the speed, steering and the like of the host vehicle 100.

Further, when a stationary object measured by the radar 3 exists in traveling lanes sequentially recognized in accordance with the white line model fitting process, the position of the stationary object on the image is determined by a method similar to the aforementioned vehicle correspondence. Further, the presence of the stationary object is emphasized by a method of, for example, applying a predetermined color to a frame surrounding its position and the so-processed stationary object is displayed on the image to thereby call attention to the driver.

Thus, according to the present embodiment, since the influence of the leading vehicles is eliminated owing to the pre-set vehicle regions, the traveling lanes can be recognized without the need for massive amounts of calculations.

The above description has been made of the operation at the time that road environments are relatively good as in the case of a motor road or the like. Thus, the processing for the operation is not so complex.

However, an autocruise device or automatic driving device activated under the control of the distance between vehicles may preferably be used even for the general road as well as for the motor road.

However, the general road becomes so complex in road environment as distinct from the motor road.

A typical one includes a road environment in the vicinity of an intersection.

Figure 9:
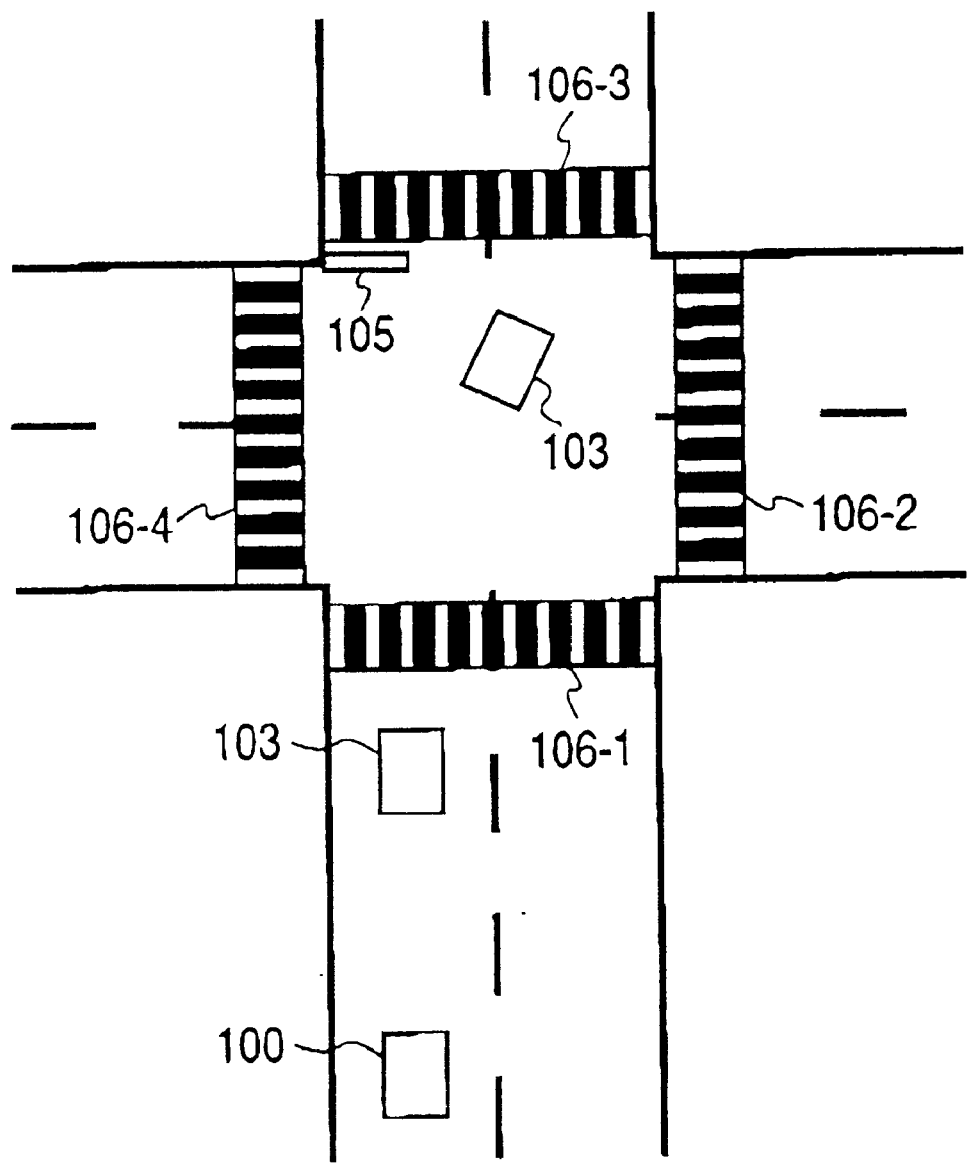
FIG. 9 is a diagram for describing vehicle positions on a general road track.

FIG. 9 shows the outline of a general road including an intersection. A vehicle 104 that waits for turning to the right within the intersection, persons (pedestrians) that walk along pedestrian crossings 106-1 to 106-4, a traffic signal 105, etc. exist in the traveling direction of a host vehicle 100 as well as the existence of a vehicle 103 headed in the same direction as that of the host vehicle 100.

Thus, if the host vehicle follows the leading vehicle 103 as it is where the leading vehicle 103 passes through the intersection immediately before the traffic signal 105 turns from yellow to red when the host vehicle follows the leading vehicle, the host vehicle will give rise to an accident in the vicinity of the intersection.

Further, the pedestrians or the vehicle 104 to be turned to the right are apt to cross between the host vehicle 100 and the leading vehicle 103. In such a case, a danger avoidance measure must be taken.

It is thus necessary to implement run environment recognition capable of coping with any conditions.

To this end, a decision as to whether the host vehicle 100 is located in the vicinity of the intersection, is required. However, the road map device 4 shown in FIG. 1 is utilized in the present embodiment.

The road map device 4 includes a CD-ROM having a road map stored therein, a hard disk, etc.

Figure 10:
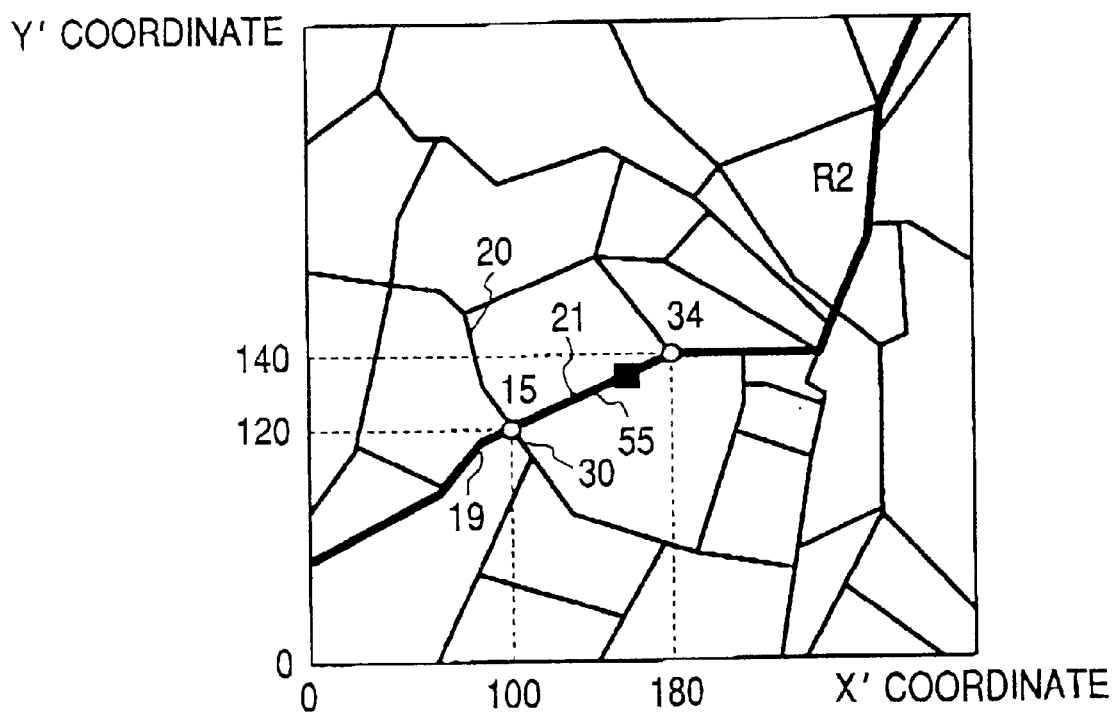
FIG. 10 is an explanatory diagram showing one example of a road map employed in the embodiment shown in FIG. 1.

The road map stored in the road map device 4 employed in the present embodiment comprises actual roads shown in FIG. 10 and a table-like database comprised of information related to nodes (corresponding to points where roads and roads intersect, i.e., intersecting points) and information related to links (roads for connecting nodes and nodes to one another) in association with the actual roads as shown in FIG. 11. Now, void circular marks ○ indicate the nodes, the links are indicated by lines and numerals indicate their numbers.

Incidentally, the road map includes positions of facilities such as buildings, parks, etc., railways, water systems, etc., and also has name or designation data, etc. They also need to be stored in the road map device 4 as those for car navigation. However, since they are not related to the present invention, they will be omitted herein.

As the database includes a node table and a link table as shown in FIG. 11. First, the node table includes numbers and coordinates of nodes, the number of links that flow out from the nodes, and their link numbers. Next, the link table includes numbers of links, start and end nodes constituting the links, and link lengths.

At this time, the node numbers are determined so as not to overlap each other and the link numbers are also determined in the same manner as the node numbers.

Next, the correspondence of each table shown in FIG. 11 and the actual road map will be described by the road map shown in FIG. 10 by way of example. It can be understood that node numbers 15 and 34 shown in the node table of FIG. 11 correspond to nodes indicated by the circular marks ○ in FIG. 10 from their coordinate values.

It is also understood that the number of links that flow out from the node designated at numeral 15 is four and they are indicated by link numbers 20, 21, 19 and 30.

If the link number 21 in the link table is taken, then this is found to be a road that is headed from the node 15 to a node 34. Thus, if this roadway is not intended for one-way traffic, then a road headed from the node 34 to the node 15 exists. If this is viewed from the link table, it is then understood that a link number 55 is assigned to this roadway.

Incidentally, the database shown in FIG. 11 is a basic configuration and may be provided with information about nodes adjacent to nodes, yes or no of right-turn, the width of each link, etc. as well as with the database.

As shown in FIG. 1, the GPS antenna 5 is connected to the road map device 4. Thus, the road map device 4 displays the corresponding road map on the display 6 according to the position of the host vehicle 100 in a manner similar to the known car navigation system and is configured so as to display a ▫ mark indicative of the host vehicle 100 on the displayed road map as shown in FIG. 10.

Now consider that the host vehicle 100 is running toward the node 34 as shown in the drawing.

In doing so, the time required for the host vehicle 100 to reach the node 34 can be calculated from the position of the host vehicle 100, the position of the node 34 and the speed of the host vehicle 100. For that purpose, the road map device 4 is supplied with the running speed of the host vehicle 100 from a speed sensor mounted on the host vehicle 100 although it is not shown in the drawing.

Thus, when the host vehicle 100 is found to be able to arrive at the node 34 within a pre-set given time interval, the road map device 4 outputs an intersection arrival signal and the distance to an intersection to the image processing device 1.

When the image processing device 1 receives the intersection arrival signal and the distance to the intersection therein, the image processing device 1 executes additional recognizing processes such as a traffic signal recognizing process, a right-turned vehicle recognizing process, a pedestrians recognizing process, etc. based on the image photographed by the imaging device 2 in addition to the above-described white line recognizing process.

Figure 12:
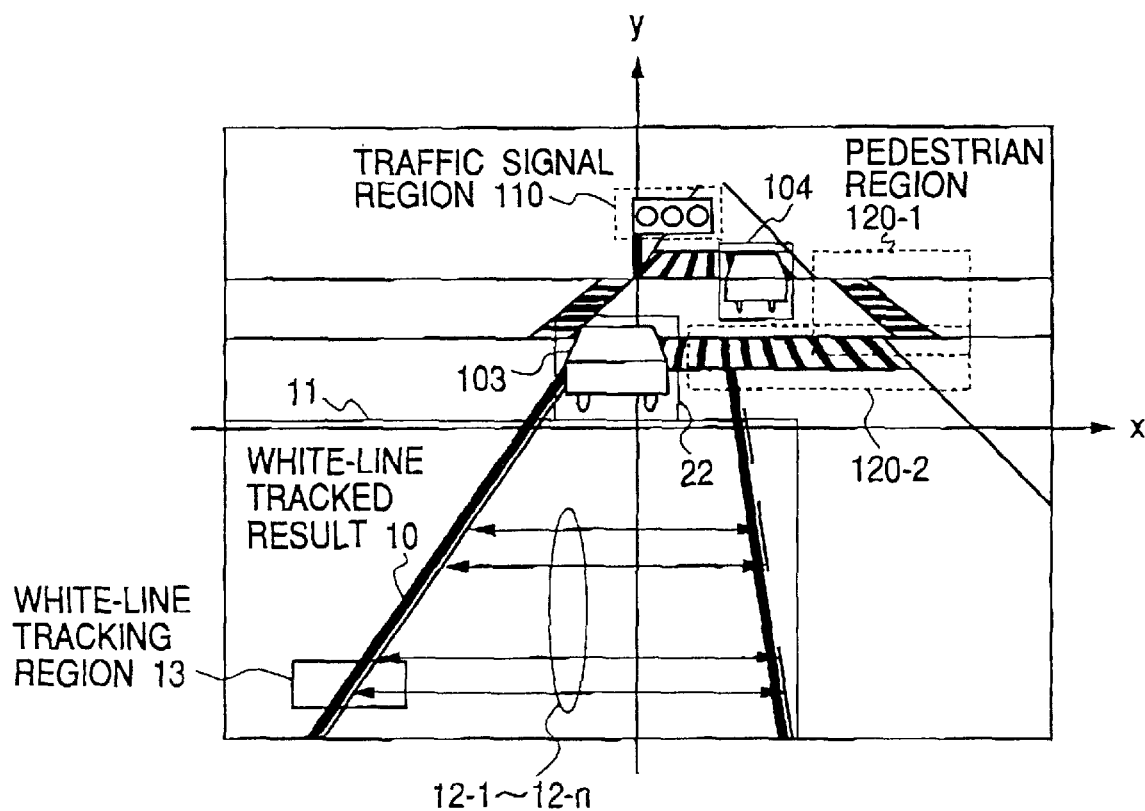
FIG. 12 is a diagram for describing the application of one embodiment of the present invention to a general road.

These additional recognizing processes will now be explained with reference to FIG. 12.

In the traffic signal recognizing process, a region in which a traffic signal is estimated to exist, i.e., a traffic signal region 110 is determined from knowledge about the distance to an intersection and the height of the a pre-set traffic signal in accordance with the same method as that used for the above correspondence of the leading vehicle and the image. Further, the state of traffic lights is recognized from internal color information of the traffic signal region 110.

When the yellow or red is recognized, the image processing device 1 outputs a follow-up running halt signal through the signal line 7 shown in FIG. 1 and displays the result of recognition on the image through the use of a message or the like.

Next, the right-turned vehicle recognizing process, i.e., a process for recognizing a right-turned vehicle being at a standstill due to a wait for right-turning is executed as follows: A stationary object close to the right white line model of the white line models determined in accordance with the white line recognition is selected from the position information about the stationary object measured by the radar 3 to thereby judge the stationary object as the right-turned vehicle 104.

The image processing device 1 outputs a deceleration signal through the signal line 7 as needed so as to be applied to vehicle control.

Further, the pedestrians recognizing process is executed as follows: A region in which a pedestrian crossing is estimated to exist by using information about the white line model and the distance to an intersection, i.e., pedestrian regions 120-1 and 120-2 are estimated. Further, the known mobile identifying technique is applied to a corresponding region of an image taken or picked up by the imaging device 2 to thereby recognize pedestrians.

As a known example of the mobile identifying technique, may be mentioned one described in the following reference, for example.

[Extraction of Moving Persons using Dynamic Image], pp. 7-383–7-384 by Takeshi Akyoin, et al. at Spring National Meeting of Electronic Information Communications Association in 1990.

Thus, according to this embodiment, a run environment can be more accurately identified even in the case of a general road. Further, the present embodiment can provide a great contribution to the ensuring of safety driving and the implementation of automatic driving.

According to the present invention, conditions around a host vehicle can be recognized with a satisfactory response even under complex run environments. As a result, an improvement in safety and a car automatic operation can be greatly achieved.

While the present invention has been described with reference to the illustrative embodiment, this description is not intended to be construed in a limiting sense. Various modifications of the illustrative embodiment of the invention will be apparent to those skilled in the art on reference to this description. It is therefore contemplated that the appended claims will cover any such modifications or embodiments as fall within the true scope of the invention.

What is claimed is:

1. A run environment recognizing apparatus comprising:
   an imaging device for sensing the direction of traveling of a host vehicle as imaging vision;
   a radar for detecting the direction of traveling of the host vehicle as a detection range;
   an image processing device for recognizing traveling lanes, leading vehicles and stationary objects located ahead of the host vehicle, based on the image information sensed by said imaging device and the result of detection by said radar; and
   a display for displaying the results of recognition by said image processing device;
   said image processing device including means for setting vehicle regions indicative of the leading vehicles within said image information, based on the result of detection by said radar;
   whereby the influence of the leading vehicles in the process for recognizing the traveling lanes within said image information is eliminated by said vehicle regions, further including a road map device for associating a vehicle position obtained from a vehicle position detecting device using satellite radio waves with a road map,
   wherein said image processing device receives information about an intersection ahead of the host vehicle while running, from said road map device, estimates positions of a traffic signal and a pedestrian crossing within the image obtained from said imaging device in the vicinity of the intersection to thereby recognize the state of the traffic signal, pedestrians and right- and left-turned vehicles and display them on said display.

2. A run environment recognizing apparatus according to claim 1, wherein an imaging optical axis of said imaging device and a detection axis of said radar are placed on the same axis.

3. A run environment recognizing apparatus according to claim 1, wherein said imaging device is provided on the driver's seat side of the vehicle and records an image extending in the viewpoint direction of a driver by photography.

4. A run environment recognizing apparatus according to claim 1, wherein said imaging device is placed on the side opposite to the driver's seat side of the vehicle and records images including portions invisible from the driver by photography.

5. A run environment recognizing apparatus comprising:
   an imaging device for sensing the direction of traveling of a host vehicle as imaging vision;
   a radar for detecting the direction of traveling of the host vehicle as a detection range;
   an image processing device for recognizing traveling lanes, leading vehicles and stationary objects located ahead of the host vehicle, based on the image information sensed by said imaging device and the result of detection by said radar; and
   a display for displaying the results of recognition by said image processing device;
   said image processing device including means for setting vehicle regions indicative of the leading vehicles within said image information, based on the result of detection by said radar;
   whereby the influence of the leading vehicles in the process for recognizing the traveling lanes within said image information is eliminated by said vehicle regions,
   wherein said image processing device associates the position of the host vehicle with that of a leading vehicle in the image information of said imaging device in accordance with the result of detection of distances and bearings by said radar, examines luminances or colors of horizontal pixels within said leading vehicle position, measures horizontal widths of said vehicle regions by integration of the pixels closely analogous to each other in luminance or color, and determines the type (large, middle or small size) of vehicle from the horizontal widths and the distances to thereby estimate the height of said each vehicle region.

6. A run environment recognizing apparatus comprising:
   an imaging device for sensing the direction of traveling of a host vehicle as imaging vision;
   a radar for detecting the direction of traveling of the host vehicle as a detection range;
   an image processing device for recognizing traveling lanes, leading vehicles and stationary objects located ahead of the host vehicle, based on the image information sensed by said imaging device and the result of detection by said radar; and
   a display for displaying the results of recognition by said image processing device;
   said image processing device including means for setting vehicle regions indicative of the leading vehicles within said image information, based on the result of detection by said radar;
   whereby the influence of the leading vehicles in the process for recognizing the traveling lanes within said image information is eliminated by said vehicle regions,
   wherein said image processing device sets a vertical line segment to the center of the screen used for said image information, and examines a change in luminance of each pixel from the vertical line segment to the horizontal direction, thereby detecting edges of white lines drawn on a road surface and creating white line models, using position coordinates of the edges,
   wherein said image processing device displaces a small white-line tracking region along said created white line model and changes said white line model so as to fit to the inclination of the white-line edge in said white-line tracking region.

7. A run environment recognizing apparatus comprising:
   an imaging device for sensing the direction of traveling of a host vehicle as imaging vision;
   a radar for detecting the direction of traveling of the host vehicle as a detection range;
   an image processing device for recognizing traveling lanes, leading vehicles and stationary objects located ahead of the host vehicle, based on the image information sensed by said imaging device and the result of detection by said radar; and a display for displaying the results of recognition by said image processing device;

said image processing device including means for setting vehicle regions indicative of the leading vehicles within said image information, based on the result of detection by said radar;

whereby the influence of the leading vehicles in the process for recognizing the traveling lanes within said image information is eliminated by said vehicle regions, wherein said image processing device sets a vertical line segment to the center of the screen used for said image information, and examines a change in luminance of each pixel from the vertical line segment to the horizontal direction, thereby detecting edges of white lines drawn on a road surface and creating white line models, using position coordinates of the edges, wherein said image processing device displaces said white-line tracking region to an adjacent white-line model that pairs up with said white-line model so as to continue a white-line model fitting process where said white-line tracking region collides with the vehicle region when the white-line model is varied so as to fit to the inclination of the white-line edge in said white-line tracking region.

8. A run environment recognizing apparatus according to claim 7, wherein said image processing device examines the movement of a disappearing point calculated from the white line model varied so as to fit to the inclination of the white-line edge in said white-line tracking region, determines that a curve exists forward when the amount of movement exceeds a predetermined value, and determines the curve as a right or left curve according to the direction of movement of said disappearing point.

9. A run environment recognizing apparatus comprising:

an imaging device for sensing the direction of traveling of a host vehicle as imaging vision;

a radar for detecting the direction of traveling of the host vehicle as a detection range;

an image processing device for recognizing traveling lanes, leading vehicles and stationary objects located ahead of the host vehicle, based on the image information sensed by said imaging device and the result of detection by said radar; and a display for displaying the results of recognition by said image processing device;

said image processing device including means for setting vehicle regions indicative of the leading vehicles within said image information, based on the result of detection by said radar;

whereby the influence of the leading vehicles in the process for recognizing the traveling lanes within said image information is eliminated by said vehicle regions, wherein the display of the results of recognition by said image processing device is configured so as to result in displaying emphasized by either a display for putting the coloring of the corresponding recognized portion in the image displayed on said display to a predetermined color, or a display for allowing the recognized portion to be surrounded by frame graphics, further including a road map device for associating a vehicle position obtained from a vehicle position detecting device using satellite radio waves with a road map, wherein said image processing device receives information about an intersection ahead of the host vehicle while running, from said road map device, estimates positions of a traffic signal and a pedestrian crossing within the image obtained from said imaging device in the vicinity of the intersection to thereby recognize the state of the traffic signal, pedestrians and right- and left-turned vehicles and display them on said display.

10. A run environment recognizing apparatus, comprising:

an imaging device for sensing the direction of traveling of a host vehicle as imaging vision;

a radar for detecting the direction of traveling of the host vehicle as a detection range;

an image processing device for recognizing traveling lanes, leading vehicles and stationary objects located ahead of the host vehicle, based on the image information sensed by said imaging device and the result of detection by said radar; and a display for displaying the results of recognition by said image processing device;

said image processing device including means for setting vehicle regions indicative of the leading vehicles within said image information, based on the result of detection by said radar;

whereby the influence of the leading vehicles in the process for recognizing the traveling lanes within said image information is eliminated by said vehicle regions, wherein the display of the results of recognition by said image processing device is configured so as to result in displaying emphasized by either a display for putting the coloring of the corresponding recognized portion in the image displayed on said display to a predetermined color, or a display for allowing the recognized portion to be surrounded by frame graphics, wherein said image processing device associates the position of the host vehicle with that of a leading vehicle in the image information of said imaging device in accordance with the result of detection of distances and bearings by said radar, examines luminances or colors of horizontal pixels within said leading vehicle position, measures horizontal widths of said vehicle regions by integration of the pixels closely analogous to each other in luminance or color, and determines the type (large, middle or small size) of vehicle from the horizontal widths and the distances to thereby estimate the height of said each vehicle region.

11. A run environment recognizing apparatus according to claim 10, further including a road map device for associating a vehicle position obtained from a vehicle position detecting device using satellite radio waves with a road map, wherein said image processing device receives information about an intersection ahead of the host vehicle while running, from said road map device, estimates positions of a traffic signal and a pedestrian crossing within the image obtained from said imaging device in the vicinity of the intersection to thereby recognize the state of the traffic signal, pedestrians and right- and left-turned vehicles and display them on said display.

12. A run environment recognizing apparatus, comprising:

an imaging device for sensing the direction of traveling of a host vehicle as imaging vision;

a radar for detecting the direction of traveling of the host vehicle as a detection range;

an image processing device for recogizing traveling lanes, leading vehicles and stationary objects located ahead of the host vehicle, based on the image information sensed by said imaging device and the result of detection by said radar; and a display for displaying the results of recognition by said image processing device;

said image processing device including means for setting vehicle regions indicative of the leading vehicles within said image information, based on the result of detection by said radar;

whereby the influence of the leading vehicles in the process for recognizing the traveling lanes within said image information is eliminated by said vehicle regions, wherein said image processing device sets a vertical line segment to the center of the screen used for said image information, and examines a change in luminance of each pixel from the vertical line segment to the horizontal direction, thereby detecting edges of white lines drawn on a road surface and creating white line models, using position coordinates of the edges, further including a road map device for associating a vehicle position obtained from a vehicle position detecting device using satellite radio waves with a road map, wherein said image processing device receives information about an intersection ahead of the host vehicle while running, from said road map device, estimates positions of a traffic signal and a pedestrian crossing within the image obtained from said imaging device in the vicinity of the intersection to thereby recognize the state of the traffic signal, pedestrians and right- and left-turned vehicles and display them on said display.

13. A run environment recognizing apparatus according to claim 12, wherein the display of the results of recognition by said image processing device is configured so as to result in displaying emphasized by either a display for putting the coloring of the corresponding recognized portion in the image displayed on said display to a predetermined color, or a display for allowing the recognized portion to be surrounded by frame graphics.

14. A run environment recognizing apparatus according to claim 13, wherein said image processing device associates the position of the host vehicle with that of a leading vehicle in the image information of said imaging device in accordance with the result of detection of distances and bearings by said radar, examines luminances or colors of horizontal pixels within said leading vehicle position, measures horizontal widths of said vehicle regions by integration of the pixels closely analogous to each other in luminance or color, and determines the type (large, middle or small size) of vehicle from the horizontal widths and the distances to thereby estimate the height of said each vehicle region.

15. A run environment recognizing apparatus according to claim 12, wherein said image processing device displaces a small white-line tracking region along said created white line model and changes said white line model so as to fit to the inclination of the white-line edge in said white-line tracking region.

16. A run environment recognizing apparatus according to claim 15, wherein said image processing device displaces said white-line tracking region to an adjacent white line model that pairs up with said white line model so as to continue a white-line model fitting process where said white-line tracking region collides with the vehicle region when the white line model is varied so as to fit to the inclination of the white-line edge in said white-line tracking region.

* * * * *